N. C. FOLGER.
Churn.
No. 83,057.
Patented Oct. 13, 1868.
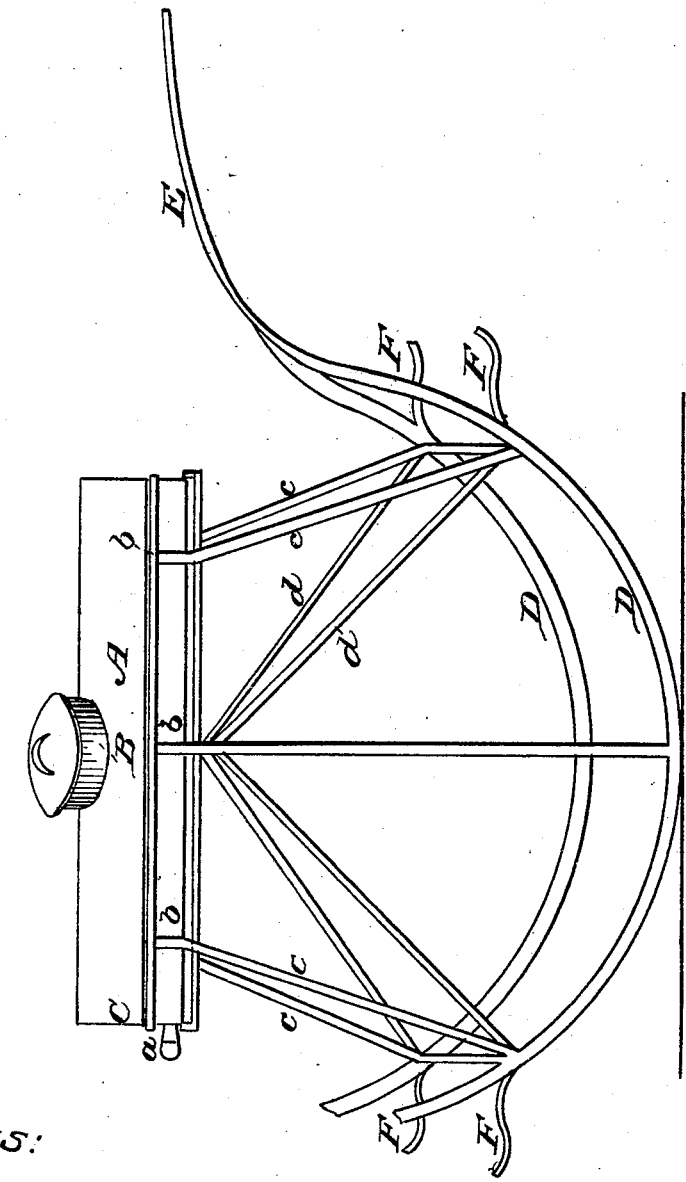
WITNESSES:
INVENTOR

NATHAN C. FOLGER, OF NEW ORLEANS, LOUISIANA.

Letters Patent No. 83,057, dated October 13, 1868.

IMPROVEMENT IN CHURNS.

The Schedule referred to in these Letters Patent and making part of the same.

*To all whom it may concern:*

Be it known that I, NATHAN C. FOLGER, of the city of New Orleans, and State of Louisiana, have invented a certain new and useful Improvement in Churns; and I do hereby declare the following to be a full, clear, and exact description of the same, reference being had to the annexed drawing, making a part of this specification, and which presents a perspective view of my improvement.

My invention refers rather to the operation of the churn, or mode of operating it, than to any inherent or extrinsic attribute of the churn itself, and it consists of an arrangement of an elongated churn on circular supports, or some equivalent device, in such a manner that a violent agitation of the milk may be effected by a plunging motion of the churn, and a consequent quick production of the butter without the use of a dasher, and with a very small expenditure of labor.

But my invention will be better understood by referring to the drawings.

A is the churn, which, for ordinary family use, should be about three feet long, and eight inches in diameter. It may be cylindrical or square, or of any intermediate form, accordingly as the fancy of the constructor may dictate, and be constructed of metal, wood, or any other suitable material, but in all cases the above, or something near the above proportions as to length and diameter, should be preserved, even in the case of a very great increase of the size of the churn for dairy-purposes. The churn is provided with a covered opening, B, on its upper side, for the convenient introduction of the milk, and a removable head, C, near the lower edge of which a tube, $a$, is inserted, which is provided with a stopper at its outer, and covered over with a fold of wire gauze at its inner extremity, in order that the milk may be withdrawn at any time, whilst the butter is left in the churn. The butter may be afterwards taken out, and the churn thoroughly cleansed, by the withdrawal of the head C.

At about the relative elevation that is shown on the drawing, the churn, whatever its size or form in its transverse sections, above the circular supports or rockers D, is secured in a horizontal position by means of the encircling bands $b$, or some equivalent arrangement, and the rods and braces $c$ and $d$. The radius of the curve of the rockers D should not be as great as the distance between the said rockers and the churn, but a considerable variation may be made in this behalf without at all affecting the results attained or the end in view. A reversely curved extension, E, of one or both the rockers D, is made in order to afford a means for giving motion to the churn, either with the hand or foot, or by connecting the same with some proper mechanical motor.

In some cases, a seat or saddle might be placed on one or both these extensions, and a boy be put upon it to do the churning, whilst amusing himself with a ride.

To produce a quick reciprocating or reverse action or roll of the rockers, the springs F are secured underneath the same, at about the points shown. The tensile force or power of these springs should be accurately calculated, so that whilst it should be sufficient to induce a quick recoil of the rockers and churn, it will not yet go to that extent as to make the recoil too sudden and abrupt or vehement.

In describing my invention, I have indicated the mode of operating it, for all that is necessary further to be said on this point is, that the milk is to be put in the churn until it is half or two-thirds full, and agitated by rocking the same through the agency of the rockers D, by means of the extensions E, either by hand, foot, or other power. No dasher is required, nor can it fail to be perceived that very little power is necessary to impart motion by my method. I have found that a mere child will do the churning of a family, not only without fatigue, but with all the cheerful alacrity with which it would engage in a game of mere amusement or play.

Having thus described my invention,

What I claim, and desire to secure by Letters Patent, is—

The arrangement of the churn A, with relation to the rockers D, when the latter are provided with the springs F, and all the parts are constructed and united in the manner and by the means substantially as herein described, for the purpose set forth.

NATHAN C. FOLGER.

Witnesses:
E. G. WELLS,
A. G. BRICE.